US009514606B2

(12) United States Patent
Hornik

(10) Patent No.: US 9,514,606 B2
(45) Date of Patent: Dec. 6, 2016

(54) WAGERING GAME WITH MYSTERY BONUS TRIGGERS

(75) Inventor: Jeremy Hornik, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 655 days.

(21) Appl. No.: 12/514,421

(22) PCT Filed: Nov. 9, 2007

(86) PCT No.: PCT/US2007/023753

§ 371 (c)(1),
(2), (4) Date: May 11, 2009

(87) PCT Pub. No.: WO2008/060513

PCT Pub. Date: May 22, 2008

(65) Prior Publication Data

US 2010/0048293 A1 Feb. 25, 2010

Related U.S. Application Data

(60) Provisional application No. 60/865,358, filed on Nov. 10, 2006.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ....... *G07F 17/3244* (2013.01); *G07F 17/3267* (2013.01); *G07F 17/34* (2013.01)

(58) Field of Classification Search
CPC ... G07F 17/34; G07F 17/3244; G07F 17/3267
USPC ........................................ 463/16, 20, 25, 26
See application file for complete search history.

(56) References Cited

U.S. PATENT DOCUMENTS

| | | | |
|---|---|---|---|
| 4,695,053 | A | 9/1987 | Vazquez et al. |
| 5,655,961 | A | 8/1997 | Acres et al. |

(Continued)

FOREIGN PATENT DOCUMENTS

| | | |
|---|---|---|
| AU | 2005251830 B2 | 12/2005 |
| EP | 0945837 | 9/1999 |

(Continued)

OTHER PUBLICATIONS

"International Application Serial No. PCT/US2007/023753 Search Report mailed Jun. 23, 2008", 4 pgs.

(Continued)

*Primary Examiner* — Omkar Deodhar
*Assistant Examiner* — Wei Lee
(74) *Attorney, Agent, or Firm* — Nixon Peabody LLP

(57) ABSTRACT

Methods, apparatus and systems for triggering a bonus game with a wagering game machine are described. A bonus triggering module is used for adjusting a payout frequency to trigger one or more bonus games. In some embodiments, the bonus triggering module uses a player selection to trigger a bonus game. In various embodiments, occurrences of hidden events are generated to mystery trigger a bonus game. Wagering game machines according to the various embodiments of the invention are also disclosed.

32 Claims, 6 Drawing Sheets

(56) References Cited

U.S. PATENT DOCUMENTS

| | | | | |
|---|---|---|---|---|
| 5,941,773 | A * | 8/1999 | Harlick | 463/26 |
| 6,135,884 | A * | 10/2000 | Hedrick et al. | 463/20 |
| 6,190,255 | B1 | 2/2001 | Thomas et al. | |
| 6,203,429 | B1 | 3/2001 | Demar et al. | |
| 6,234,897 | B1 * | 5/2001 | Frohm et al. | 463/20 |
| 6,375,570 | B1 | 4/2002 | Poole | |
| 6,443,837 | B1 | 9/2002 | Jaffe et al. | |
| RE37,885 | E | 10/2002 | Acres et al. | |
| 6,561,900 | B1 | 5/2003 | Baerlocher et al. | |
| 6,565,436 | B1 * | 5/2003 | Baerlocher | 463/26 |
| 6,648,757 | B1 * | 11/2003 | Slomiany et al. | 463/20 |
| 6,860,810 | B2 | 3/2005 | Cannon et al. | |
| RE38,812 | E | 10/2005 | Acres et al. | |
| 6,960,134 | B2 | 11/2005 | Hartl et al. | |
| 7,144,321 | B2 | 12/2006 | Mayeroff | |
| 7,235,011 | B2 * | 6/2007 | Randall et al. | 463/25 |
| 7,278,919 | B2 * | 10/2007 | Souza et al. | 463/25 |
| 7,285,049 | B1 | 10/2007 | Luciano, Jr. et al. | |
| 7,445,548 | B1 | 11/2008 | Muskin | |
| 7,722,453 | B2 | 5/2010 | Lark et al. | |
| 7,771,264 | B2 | 8/2010 | Kane et al. | |
| 7,914,377 | B2 | 3/2011 | Benbrahim et al. | |
| 7,967,675 | B1 | 6/2011 | Delaney et al. | |
| 8,202,158 | B2 | 6/2012 | Anderson et al. | |
| 2001/0009865 | A1 * | 7/2001 | Demar et al. | 463/20 |
| 2001/0011797 | A1 | 8/2001 | Pierce et al. | |
| 2002/0025847 | A1 | 2/2002 | Thomas et al. | |
| 2002/0039919 | A1 | 4/2002 | Joshi et al. | |
| 2002/0090990 | A1 | 7/2002 | Joshi et al. | |
| 2002/0142825 | A1 * | 10/2002 | Lark et al. | 463/16 |
| 2002/0175466 | A1 | 11/2002 | Loose et al. | |
| 2003/0036423 | A1 | 2/2003 | Vancura | |
| 2003/0060266 | A1 | 3/2003 | Baerlocher | |
| 2003/0060281 | A1 | 3/2003 | Vancura | |
| 2003/0114218 | A1 | 6/2003 | McClintic | |
| 2003/0153375 | A1 | 8/2003 | Vancura | |
| 2003/0176215 | A1 | 9/2003 | Palmer et al. | |
| 2003/0176220 | A1 | 9/2003 | Baerlocher | |
| 2004/0048649 | A1 | 3/2004 | Peterson et al. | |
| 2004/0048655 | A1 * | 3/2004 | Yoshioka | 463/23 |
| 2004/0048657 | A1 | 3/2004 | Gauselmann | |
| 2004/0092315 | A1 | 5/2004 | Boyd et al. | |
| 2004/0106446 | A1 | 6/2004 | Cannon et al. | |
| 2004/0147306 | A1 | 7/2004 | Randall et al. | |
| 2004/0166918 | A1 | 8/2004 | Walker | |
| 2004/0185930 | A1 | 9/2004 | Thomas et al. | |
| 2004/0219969 | A1 | 11/2004 | Casey et al. | |
| 2005/0096121 | A1 | 5/2005 | Gilliland et al. | |
| 2005/0159208 | A1 | 7/2005 | Pacey | |
| 2005/0159211 | A1 * | 7/2005 | Englman | 463/25 |
| 2005/0164765 | A1 | 7/2005 | Okuniewicz | |
| 2005/0170877 | A1 | 8/2005 | Okuniewicz | |
| 2005/0187004 | A1 | 8/2005 | Vancura | |
| 2005/0215311 | A1 * | 9/2005 | Hornik et al. | 463/20 |
| 2005/0250568 | A1 | 11/2005 | Kane et al. | |
| 2006/0014582 | A1 | 1/2006 | Harris et al. | |
| 2006/0025200 | A1 | 2/2006 | Van Asdale | |
| 2006/0035707 | A1 | 2/2006 | Nguyen et al. | |
| 2006/0046819 | A1 | 3/2006 | Nguyen et al. | |
| 2006/0073879 | A1 | 4/2006 | Baerlocher | |
| 2006/0073887 | A1 | 4/2006 | Nguyen | |
| 2006/0073888 | A1 | 4/2006 | Nguyen | |
| 2006/0073897 | A1 | 4/2006 | Englman et al. | |
| 2006/0089190 | A1 | 4/2006 | Bryant et al. | |
| 2006/0089195 | A1 | 4/2006 | Walker et al. | |
| 2006/0142079 | A1 | 6/2006 | Ikehara | |
| 2006/0166733 | A1 * | 7/2006 | Hettinger | 463/25 |
| 2007/0060314 | A1 | 3/2007 | Baerlocher et al. | |
| 2007/0060321 | A1 | 3/2007 | Vasquez | |
| 2007/0191088 | A1 | 8/2007 | Breckner et al. | |
| 2007/0218975 | A1 | 9/2007 | Iddings et al. | |
| 2007/0225065 | A1 | 9/2007 | Wright et al. | |
| 2007/0259709 | A1 | 11/2007 | Kelly et al. | |
| 2007/0293293 | A1 | 12/2007 | Baerlocher et al. | |
| 2007/0298857 | A1 | 12/2007 | Schlottmann et al. | |
| 2007/0298874 | A1 | 12/2007 | Baerlocher et al. | |
| 2007/0298875 | A1 | 12/2007 | Baerlocher et al. | |
| 2008/0020830 | A1 | 1/2008 | Ikehara et al. | |
| 2008/0020831 | A1 | 1/2008 | Ikehara et al. | |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0045344 | A1 | 2/2008 | Schlottmann et al. | |
| 2008/0064502 | A1 | 3/2008 | Schlottmann et al. | |
| 2008/0070680 | A1 | 3/2008 | Baerlocher et al. | |
| 2008/0070692 | A1 | 3/2008 | Schlottmann et al. | |
| 2008/0070693 | A1 | 3/2008 | Schlottmann et al. | |
| 2008/0070694 | A1 | 3/2008 | Schlottmann et al. | |
| 2008/0070695 | A1 | 3/2008 | Baerlocher et al. | |
| 2008/0076514 | A1 | 3/2008 | Baerlocher et al. | |
| 2008/0076515 | A1 | 3/2008 | Baerlocher et al. | |
| 2008/0076517 | A1 | 3/2008 | Baerlocher et al. | |
| 2008/0076552 | A1 | 3/2008 | Baerlocher et al. | |
| 2009/0291752 | A1 | 11/2009 | Anderson et al. | |
| 2009/0305776 | A1 | 12/2009 | Englman et al. | |
| 2010/0029369 | A1 | 2/2010 | Pacey | |
| 2010/0048283 | A1 | 2/2010 | Anderson et al. | |
| 2010/0062841 | A1 | 3/2010 | Englman et al. | |

FOREIGN PATENT DOCUMENTS

| | | | |
|---|---|---|---|
| EP | 1453023 | | 9/2004 |
| WO | WO-03006129 | A1 | 1/2003 |
| WO | WO-030036423 | A1 | 2/2003 |
| WO | WO-20050187004 | A1 | 8/2005 |
| WO | WO-2006076185 | A2 | 7/2006 |
| WO | WO-2008030904 | A2 | 3/2008 |
| WO | WO-2008063408 | A3 | 3/2008 |
| WO | WO-2008060426 | A2 | 5/2008 |
| WO | WO-2008060426 | A3 | 5/2008 |
| WO | WO-2008060429 | A2 | 5/2008 |
| WO | WO-2008060429 | A3 | 5/2008 |
| WO | WO-2008060442 | A2 | 5/2008 |
| WO | WO-2008060442 | A3 | 5/2008 |
| WO | WO-2008060442 | C2 | 5/2008 |
| WO | WO-2008060459 | A2 | 5/2008 |
| WO | WO-2008060459 | A3 | 5/2008 |
| WO | WO-2008063408 | A2 | 5/2008 |

OTHER PUBLICATIONS

"International Application Serial No. PCT/US2007/023753 Written Opinion mailed Jun. 23, 2008", 8 pgs.

"U.S. Appl. No. 12/513,974, Examiner Interview Summary mailed Apr. 22, 2011", 3 pgs.

"U.S. Appl. No. 12/513,974, Non Final Office Action mailed Feb. 2, 2011", 15 pgs.

"U.S. Appl. No. 12/513,974, Response filed May 2, 2011 to Non Final Office Action mailed Feb. 2, 2011", 11 pgs.

"U.S. Appl. No. 12/513,994, Non Final Office Action mailed Dec. 10, 2010", 10 pgs.

"U.S. Appl. No. 12/513,994, Response filed Apr. 11, 2011 to Non Final Office Action mailed Dec. 10, 2001", 10 pgs.

"U.S. Appl. No. 12/514,019, Examiner Interview Summary mailed Apr. 25, 2011", 4 pgs.

"U.S. Appl. No. 12/514,019, Non Final Office Action mailed Jan. 20, 2011", 9 pgs.

"U.S. Appl. No. 12/514,019, Response filed Apr. 2, 2011 to Non Final Office Action mailed Jan. 20, 2011", 12 pgs.

"U.S. Appl. No. 12/514,038, Non Final Office Action mailed Jan. 5, 2011", 10 pgs.

"U.S. Appl. No. 12/514,038, Response filed Apr. 5, 2011 to Non Final Office Action mailed Jan. 5, 2011", 10 pgs.

"U.S. Appl. No. 12/514,426, Non Final Office Action mailed Feb. 3, 2011", 11 pgs.

"European Application Serial No. 07861814.7, Extended European Search Report mailed Nov. 26, 2010", 7 pgs.

"European Application Serial No. 07839999.5, Extended European Search Report mailed Apr. 6, 2011", 6 Pgs.

(56) References Cited

OTHER PUBLICATIONS

"International Application Serial No. PCT/US2007/023389, International Report on Patentability completed Nov. 16, 2010", 15 pgs.
"International Application Serial No. PCT/US2007/023389, International Search Report mailed May 9, 2008", 3 pgs.
"International Application Serial No. PCT/US2007/023389, International Written Opinion mailed May 9, 2008", 7 pgs.
"International Application Serial No. PCT/US2007/023499, International Report on Patentability, mailed Jul. 24, 2009", 7 pgs.
"International Application Serial No. PCT/US2007/023499, Search Report mailed Jul. 22, 2008", 2 pgs.
"International Application Serial No. PCT/US2007/023499, Written Opinion mailed Jul. 22, 2008", 7 pgs.
"International Application Serial No. PCT/US2007/023503, International Preliminary Report on Patentability, mailed mailed on Jul. 16, 2009".
"International Application Serial No. PCT/US2007/023503, Search Report mailed on Jul. 23, 2008", 2 pgs.
"International Application Serial No. PCT/US2007/023503, Written Opinion mailed on Jul. 23, 2008", 5 pgs.
"International Application Serial No. PCT/US2007/023572, International Preliminary Report on Patentability, mailed Jun. 18, 2009", 14 pgs.
"International Application Serial No. PCT/US2007/023572, International Search Report mailed May 9, 2008", 2 pgs.
"International Application Serial No. PCT/US2007/023572, International Written Opinion mailed May 9, 2008", 7 pgs.
"International Application Serial No. PCT/US2007/023636, International Report on Patentability mailed Jun. 18, 2009", 10 pgs.
"International Application Serial No. PCT/US2007/023636, Search Report mailed Jun. 23, 2008", 2 pgs.
"International Application Serial No. PCT/US2007/023636, Written Opinion mailed Jun. 23, 2008", 7 pgs.
"International Application Serial No. PCT/US2007/023753, International Report on Patentability mailed Jun. 18, 2009", 11 pgs.
"U.S. Appl. No. 12/513,974 , Response filed Sep. 27, 2011 to Final Office Action mailed Jun. 29, 2011", 17 pgs.
"U.S. Appl. No. 12/513,974, Final Office Action mailed Jun. 29, 2011", 26 pgs.
"U.S. Appl. No. 12/513,994, Final Office Action mailed Jul. 21, 2011", 14 pgs.
"U.S. Appl. No. 12/514,019, Final Office Action mailed Jul. 21, 2011", 15 pgs.
"U.S. Appl. No. 12/514,038, Examiner Interview Summary Received Apr. 6, 2011", 3 pgs.
"U.S. Appl. No. 12/514,038, Final Office Action mailed Jun. 24, 2011", 11 pgs.
"U.S. Appl. No. 12/514,038, Non Final Office Action mailed Sep. 13, 2011", 12 pgs.
"U.S. Appl. No. 12/514,038, Response filed Aug. 24, 2011 to Final Office Action mailed Jun. 24, 2011", 12 pgs.
"U.S. Appl. No. 12/514,426, Final Office Action mailed Sep. 12, 2011", 14 pgs.
"U.S. Appl. No. 12/514,426, Response filed May 23, 2011 to Non Final Office Action mailed Feb. 3, 2011", 10 pgs.
"U.S. Appl. No. 12/513,974, Examiner Interview Summary mailed Aug. 31, 2011", 3 pgs.
"U.S. Appl. No. 12/513,974, Preliminary Amendment filed May 7, 2009", 3 pgs.
"U.S. Appl. No. 12/513,994, Examiner Interview Summary mailed Mar. 22, 2011", 3 pgs.
"U.S. Appl. No. 12/513,994, Examiner Interview Summary mailed Oct. 3, 2011", 3 pgs.
"U.S. Appl. No. 12/513,994, Preliminary Amendment filed May 7, 2009", 7 pgs.
"U.S. Appl. No. 12/513,994, Response filed Nov. 21, 2011 to Final Office Action mailed Jul. 21, 2011", 13 pgs.
"U.S. Appl. No. 12/514,019, Appeal Brief filed Jan. 17, 2012", 33 pgs.
"U.S. Appl. No. 12/514,019, Examiner's Answer to Appeal Brief mailed Jun. 6, 2012", 18 pgs.
"U.S. Appl. No. 12/514,019, Reply Brief filed Jul. 18, 2012", 9 pgs.
"U.S. Appl. No. 12/514,038, Advisory Action mailed Jun. 28, 2012", 3 pgs.
"U.S. Appl. No. 12/514,038, Examiner Interview Summary mailed Aug. 31, 2011", 3 pgs.
"U.S. Appl. No. 12/514,038, Examiner Interview Summary mailed Dec. 13, 2011", 3 pgs.
"U.S. Appl. No. 12/514,038, Final Office Action mailed Apr. 16, 2012", 10 pgs.
"U.S. Appl. No. 12/514,038, Preliminary Amendment filed May 7, 2009", 13 pgs.
"U.S. Appl. No. 12/514,038, Response filed Jun. 18, 2012 to Final Office Action mailed Apr. 16, 2012", 11 pgs.
"U.S. Appl. No. 12/514,038, Response filed Jul. 16, 2012 to Final Office Action mailed Apr. 16, 2012", 13 pgs.
"U.S. Appl. No. 12/514,038, Response filed Dec. 13, 2011 to Non Final Office Action mailed Sep. 13, 2011", 14 pgs.
"U.S. Appl. No. 12/514,426, 312 Amendment filed May 14, 2012", 8 pgs.
"U.S. Appl. No. 12/514,426, Examiner Interview Summary mailed May 24, 2011", 4 pgs.
"U.S. Appl. No. 12/514,426, Notice of Allowance mailed Feb. 14, 2012", 12 pgs.
"U.S. Appl. No. 12/514,426, Preliminary Amendment filed May 11, 2009", 7 pgs.
"U.S. Appl. No. 12/514,426, PTO Response to 312 Amendment mailed May 24, 2012", 2 pgs.
"U.S. Appl. No. 12/514,426, Response filed Dec. 22, 2011 to Final Office Action mailed Sep. 12, 2011", 16 pgs.
"Australian Application Serial No. 2007319884, Examiner Report Mailed Dec. 9, 2011", 2 pgs.
"Australian Application Serial No. 2007319923—Office Action Response", 17 pgs.
"Australian Application Serial No. 2007319923, Examiner Report mailed Dec. 19, 2011", 2 pgs.
"Australian Application Serial No. 2007319923, Response filed Mar. 7, 2012 to Examiner Report mailed Dec. 19, 2011", 5 pgs.
"Australian Application Serial No. 2007319923, Second Examiners Report mailed Apr. 12, 2012", 2 pgs.
"Australian Application Serial No. 2007319986, Examiner's Report mailed Dec. 7, 2011", 2 pgs.
"Australian Application Serial No. 2007319986, Response filed Aug. 3, 2012 to Examiner's Report mailed Dec. 7, 2011", 20 pgs.
"Australian Application Serial No. 2007319989, Office Action mailed Jan. 13, 2012", 2 pgs.
"Australian Application Serial No. 2007319989, Response filed Aug. 3, 2012 to Examiner Report mailed Jan. 13, 2012", 20 pgs.
"Australian Application Serial No. 2007320002, Examiner Report mailed Aug. 7, 2012", 3 pgs.
"Australian Application Serial No. 2007320002, Examiner Report mailed Dec. 7, 2011", 2 pgs.
"Australian Application Serial No. 2007320002, Response filed Aug. 3, 2012 to Examiner Report mailed Dec. 7, 2011", 16 pgs.

* cited by examiner

WAGERING GAME WITH MYSTERY BONUS TRIGGERS

RELATED APPLICATION

This patent application is a U.S. National Stage Filing under 35 U.S.C. 371 from International Patent Application Serial No. PCT/US2007/023753 filed Nov. 9, 2007, and published on May 22, 2008, as WO 2008/060513 A2 and republished as WO 2008/060513 A3, which claims the priority benefit of U.S. Provisional Patent Application Ser. No. 60/865,358 filed Nov. 10, 2006 and entitled "WAGERING GAME WITH MYSTERY BONUS TRIGGERS", which applications are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems.

BACKGROUND

Wagering game machine makers continually provide new and entertaining games. To keep a player entertained in repetitive wagering gaming content, a computerized wagering game may rely on the presentation of the game. One way of increasing entertainment value is to offer a variety of base wagering games and bonus wagering events. Consequently, there is a need to provide for the integration of bonus wager games with base wagering games to ensure an attractive gaming experience.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

Different bonus games can have different expected values, which can mean that interchanging bonus games with a base wagering game can cause the payout of the base wagering game to change to maintain the expected value of the wagering game. Changing the wager payouts can confuse the player and detract from the pleasure of gaming. A bonus triggering module can be used to generate relationships between random events to adjust one or more payout frequencies, one or more expected values, and one or more average payout values to maintain a predetermined expected value of a wagering game. As used herein, a module may include any combination of software, firmware and/or hardware that are logically or otherwise grouped for performing actions within a computerized system. The bonus triggering module described herein can be configured to allow any base wagering game to operate with any bonus game.

Figure 1:
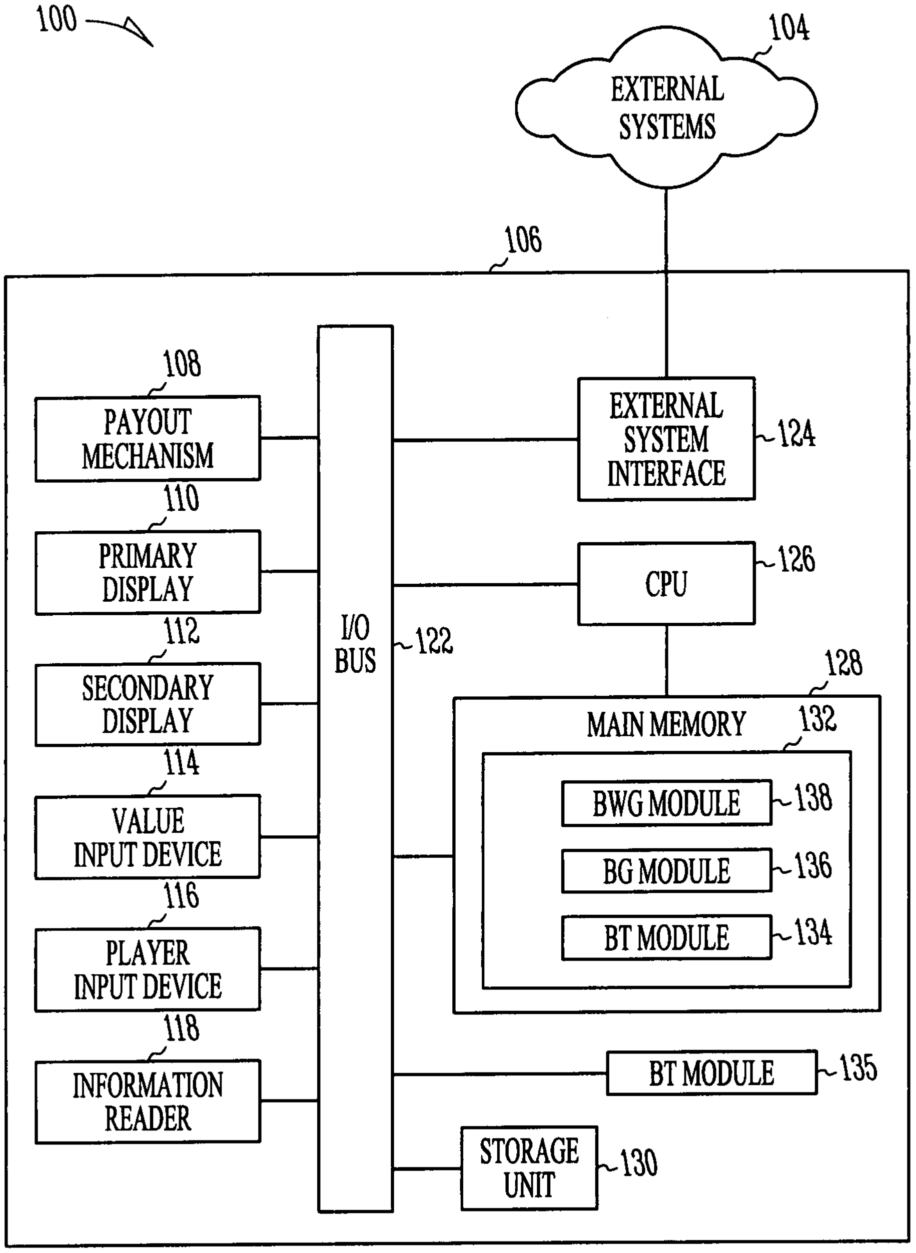
FIG. 1 is a block diagram illustrating a wagering game machine architecture, including a control system, according to example embodiments of the invention.

FIG. 1 is a block diagram illustrating a wagering game machine architecture 100, according to example embodiments of the invention. As shown in FIG. 1, the wagering game machine 106 includes a central processing unit (CPU) 126 connected to main memory 128, which includes a wagering game presentation unit 132. In one embodiment, the wagering game presentation unit 132 can present wagering games, such as video poker, video blackjack, video slots, video lottery, etc., in whole or part. The wagering game presentation unit 132 can include a bonus game module 136 and a base wagering game module 138. The bonus game module 136 and the base wagering game module 138 can be further formed in a portion of the main memory 128 separate from the wagering game presentation unit 132, in a memory in a wagering game machine 106 separate from the main memory 128, or as one or more modules separate from the wagering game machine 106. The bonus game module 136 includes data for generating outcomes of the bonus game, such as bonus game payout frequencies, a bonus game payout value, and an expected values of bonus game wagers. The base wagering game module 138 includes data for generating outcomes of a base wagering game, such as a base wagering game payout frequencies, a base wagering game payout values, and the expected value of base wagering game wagers. In one embodiment, the bonus wagering game module 136 can include information for playing a plurality of bonus games. In another embodiment, the base wagering game module 138 can include information for playing a plurality of base wagering games. In another embodiment, the bonus game module 136 and the base game module 138 are located outside the wagering game machine 106 coupled to a network device, such as a network server.

The wagering game presentation unit 132 can include a bonus triggering module 134. In one embodiment, the bonus triggering module 134 is located in a portion of the main memory 128 separate from the wagering game presentation unit 132. Examples of a bonus triggering module that can be located in a memory include subroutine code, code libraries and application program interfaces such as interpreters utilizing Java EE™, Simple DirectMedia Layer™ (SDL) and DirectX™. A bonus triggering module 135 can also be located separate from the main memory 128. Examples of a bonus triggering module 135 include microprocessors, application specific integrated circuits, application specific standard products, field programmable gate arrays, complex programmable logic devices, programmable read only memories, electrically erasable programmable read only memories and other programmable logic devices. The bonus triggering module 135 can further include subroutine code, code libraries and application program interfaces such as interpreters utilizing Java EE™, Simple DirectMedia Layer™ (SDL) and DirectX™. In one embodiment, the bonus triggering module 135 includes the bonus triggering module 134 as a subcomponent. In another embodiment, the bonus triggering module 135 includes a coprocessor and a memory unit. In another embodiment, the base wagering game machine 106 includes the bonus triggering module 134 operatively coupled to a bonus triggering module 135 using an input/output (I/O) bus 122. In another embodiment, the bonus triggering module 135 is located outside the wagering game machine 106 coupled to a network device, such as a network server.

The bonus triggering modules 134/135 can receive data from the bonus game module 136 and a base wagering game module 138 and generate random events that can be used for triggering a bonus game. The random events can be based on one or more bonus games selected by a player or a wagering game operator. In one embodiment, the random events can be used for triggering a plurality of bonus games. In another embodiment, the random events are based on predetermined symbol relationships stored in a database.

The bonus triggering modules 134/135 can include a number generator such as a random number generator. The random number generator can be substantially formed using software code, a hardware configuration, or a configuration formed from a combination of hardware and software. A random number generator can include an all-hardware random number generator adapted to generate random events based on a plurality of electrical interconnections. In one embodiment, the bonus triggering modules 134/135 include a pseudorandom number generator. Examples of random number generators include, add-with-carry (AWC) and subtract-with-borrow (SWB) generators, multiply-with-carry (MWC) generators, linear congriential and inverse congruential generators, single and combined multiple recursive generators, Fibonacci generators, generators based on random noise sources, generators using Monte Carlo and quasi Monte Carlo methods, cryptographic pseudorandom number generators, generators using NP hard algorithms, indirection-shift-accumulate-add-count (ISAAC) cryptographic random number generators and the like.

The bonus triggering modules 134/135 can include one or more data files or look-up tables containing information for associating a base wagering game and one or more bonus games. The data files and lookup tables can further include information for associating the bonus game module 136 and the base wagering game module 138. In one embodiment, the bonus triggering modules 134/135 include data for relating one or more base wagering games to a bonus game.

The CPU 126 is also connected to an I/O bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

In one embodiment, the wagering game machine 106 can include additional peripheral devices and/or more than one of each component shown in FIG. 1. For example, in one embodiment, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 (e.g., the wagering game presentation unit 132) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Bonus Triggering Module

Figure 2:
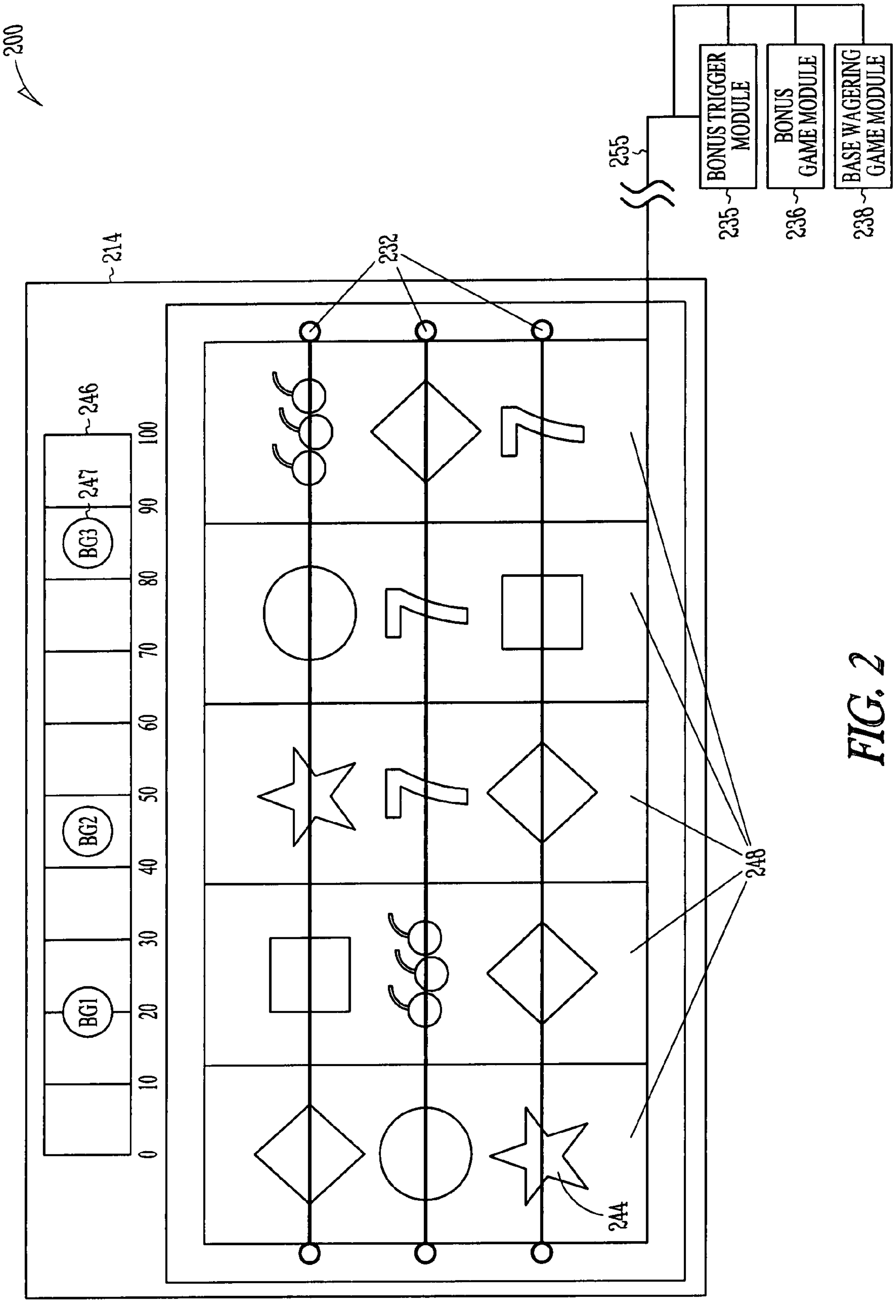
FIG. 2 is a view of a wagering game machine according to example embodiments of the invention.

FIG. 2 is a view of a wagering game machine 200, according to example embodiments of the invention. In this embodiment, the wagering game machine 200 includes a display 214 operatively coupled to a base wagering game module 238, a bonus triggering module 235, and a bonus game module 236 using a transmission medium 255. In various embodiments, the transmission medium includes a network, such as an optical network or a wireless or a wireless network. The primary display 214 is shown here including an optional gauge 246 and five reels 248 presenting an array of symbols 244 positioned across pay lines 232. The pay lines 232 are not restricted to the horizontal sequence shown and can include one or more zigzag line arrangements formed across the primary display 214. The gauge may be provided to enhance the gaming experience, but the wagering game machine 106 can operate without using the gauge 246. The gauge 246 is a representation of an interactive menu providing one or more wagering game options for viewing and/or selection. Although the gauge 246 is shown in the form of a scale, any type of image, whether mathematical or non-mathematical, can be displayed. The gauge 246 shown is not intended to represent any particular size, shape or feature that can be embodied in it. Examples of gauge 246 construction include visual displays using light emitting diodes, liquid crystals, electron beams, phosphorescent compounds, incandescent sources, fluorescent sources, plasma sources, thermal sources and other sources that can be used to form an image. When used, the gauge 246 can be operatively coupled to the bonus triggering module 235 to allow a player to enter values related to a bonus game. Risk-related values may be related to average payout values, payout frequencies, expected values, relationships between wagering events, bonus game identifiers, such as icons, coupled to bonus games, and a probably frequency relationship. The risk-related values can be based on near real-time generated values or predetermined values stored in a memory. The bonus game identifiers can be icons or other such images for providing bonus game recognition.

The bonus triggering module 235 can be configured to accept a range of data from one or more bonus game modules 236, including a bonus game payout frequencies, bonus game payout values and bonus game expected values.

The bonus triggering module 235 can be configured to allow a player or a wagering game operator to select any bonus game for playing.

The expected value of a wagering game can be expressed according to the relationship $$EV(x)=\sum_{all\ x}(\text{frequency}(x)\times\text{Pay}(x))/W$$

where W is the value of the wager, frequency(x) is the frequency of occurrence of an event x, and Pay(x) is the payout value assigned to that event. In one embodiment, the wager requirement does not change and the expected value of the wager can be expressed as $$EV_T=EV_{BWG}+EV_{BG},$$

where $EV_{BWG}$ and $EV_{BG}$ are the expected values of the base wagering game and the bonus game, respectively. In this embodiment, the expected value of a bonus game can be expressed as $$EV_{BG}=\sum_{all\ 1k}\text{frequency}(k)\times\langle Pay(k)\rangle_{BG},$$

where frequency(k) is the bonus game payout frequency and $\langle Pay(k)\rangle_{BG}$ is the average payout value of the bonus game at the frequency(k). The expected value of the base wagering game can be expressed as $$EV_{BWG}=\sum_{all\ y}(\text{frequency}(y)\times\langle Pay(y)\rangle)_{BWG},$$

where frequency(y) is the frequency of occurrence of an event y of the base wagering game and $\langle Pay(y)\rangle_{BWG}$ is the average payout value assigned to that event.

In one embodiment, $\langle Pay\rangle_{BWG}$ and $\langle Pay\rangle_{BG}$ are constant values and the bonus triggering module 235 adjusts a payout frequency of a specified bonus game to match $EV_T$. In another embodiment, the bonus game payout frequency and the base wagering game payout frequency are constant and the bonus triggering module 235 adjusts an average payout value $\langle Pay\rangle_{BWG}$ and/or $\langle Pay\rangle_{BG}$ to match $EV_T$. In another embodiment, $EV_{BWG}$ is constant and $EV_{BG}$ is adjusted by the bonus triggering module 235 to match $EV_T$. In another embodiment, $EV_{BG}$ is constant and $EV_{BWG}$ is adjusted by the bonus triggering module 235 to match $EV_T$.

The base wagering game module can also provide access to multiple bonus games. In one embodiment, a single wagering operation can trigger access to a plurality of bonus games. In another embodiment, the total expected value of a wager can be expressed as $$EV_T=EV_{BWG},+\sum_{i=1}^{n}EV_{iBG},$$

where $EV_{iBG}$, is the expected value of the ith bonus game and n is the number of bonus games available for play upon the triggering of a bonus event. In one embodiment, a player can select one or more bonus games that can be played during a single wagering operation. In another embodiment, a wagering game operator can select the bonus games that can be played during a single wagering operation. In another embodiment, two or more bonus games can be played based on a single wagering operation. Here, a display such as display 214, can be partitioned to image multiple games such as a split screen display or with a picture within a picture arrangement. In another embodiment, the wagering game operator can select the number of bonus games available for selection by a player. In another embodiment, a bonus triggering module adjusts the payout frequencies of the plurality of bonus games selected by a player based on a base wagering game payout frequency. In another embodiment, the bonus game payout frequencies and the base wagering game payout frequency are constant and a bonus triggering module adjusts the average payout value $\langle Pay\rangle_{BWG}$ and/or two or more average bonus game payout values, $\langle Pay\rangle_{iBG}$. In another embodiment, $EV_{BWG}$ is constant and one or more $EV_{iBG}$ is adjusted by a bonus triggering module. In another embodiment, $$\sum_{i=1}^{n}EV_{iBG}$$

is constant and $EV_{BWG}$ is adjusted by a bonus triggering module.

A bonus triggering module can also be configured to permit a player to enter an additional wager upon triggering a bonus game. In one embodiment, the player is allowed to enter one or more additional wagers based on the number of bonus games selected prior to triggering a bonus game event. In another embodiment, a bonus triggering module triggers a free game, such as a free spin.

All Mystery Bonus Triggering Example

The bonus triggering module 235 generates random associations for each wagering operation. The random associations can appear with a probability frequency to match a payout frequency to trigger a bonus game from a specified wagering game machine 200. In one embodiment, a probability distribution is adjusted to provide a specified probability frequency. In another embodiment, the frequency of the events is adjusted to provide a specified probability frequency.

The bonus module 235 can be configured to provide an all mystery triggered wagering game to provide access to a plurality of bonus games. A mystery bonus trigger is a hidden sequence of events that triggers a bonus game, where the sequence of events triggering the bonus game is unknown to the player. The mystery bonus triggers are independent of the reel positions associated with the base wagering game that are displayed at the completion of a wager. The mystery bonus triggers can be generated using a random number generator. Here, the player can select one or more bonus games based on a specified bonus game payout value. The mystery bonus triggers are then generated with a frequency corresponding to a bonus game payout frequency for the selected bonus games to match an expected value of a base wagering game. A random number generator can be coupled to a lookup table to trigger access to the selected bonus game. The hidden triggers can also be generated with a probability frequency associated with matching one or more expected values, such as $EV_{BWG}$, $EV_{iBG}$, and $$\sum_{i=1}^{n} EV_{iBG}$$

to obtain a specified $EV_T$. In another embodiment, the mystery bonus triggers can occur in association with the one or more bonus games selected by a wagering game operator. In one embodiment, the player can enter an additional wager to match the expected values of the selected bonus games.

A display such as gauge 246 can be configured to facilitate play of a mystery bonus game. The gauge 246 can also be configured to further cooperate with the reels 248 to select and to adjust a payout bonus frequency to match one or more expected values, such as $EV_{BWG}$, $EV_{iBG}$, and $$\sum_{i=1}^{n} EV_{iBG}$$

to obtain a specified $EV_T$.

The gauge 246 can also be configured to operate as an additional reel to adjust or to select a probability frequency. In one embodiment, the gauge 246 displays a number representing a probability associated with mystery triggering of a bonus game, such as the likelihood of playing a specified bonus game. In another embodiment, the gauge can further display a result indicating a selection that would have provided a bonus game for the wager entered.

The gauge 246 can further display a range of parameters associated with a plurality of bonus games. In one embodiment, the gauge 246 presents a range of risks in association with a bonus game identifier 247. Here, the gauge 246 can display one or more bonus games identifiers 247 arranged in relation to an associated wagering risk or an associated payout frequency. The gauge 246 can also be operable as a touch-screen display to select a bonus game. The gauge can also be configured on the display 214 as a picture within a picture format or as a split screen display. In another embodiment, the gauge 246 is presented as a thermometer displaying a level of risk associated with a wager. In another embodiment, the gauge 246 is configured to display the bonus games specified by the player or a gaming operator.

The gauge 246 can display a probability distribution graphic, or other such feature indicating the likelihood of winning as a function of the value of the wager. For example, the gauge can display a range corresponding to a high likelihood of wining a bonus with lower payout on one end and a lower likelihood of winning a bonus game with higher payout on the other end. The player can select a range of values or a single value as the basis for a wager. In one embodiment, the values assigned to the gauge 246 represent a multiplier associated with the number of symbols on one or more reel strips.

The gauge 246 can be operatively coupled to a data file or a weighted table to select values to match an average payout value, a payout frequency and an expected value of a wager. The data file can include a plurality of templates generated for combinations of bonus games and base wagering games. The data file can be included in the main memory (shown in FIG. 1 as 128) of a wagering game machine 200, in a separate memory unit located in the wagering game 200, and in a memory unit located separate from the wagering game machine 200.

Figure 3:
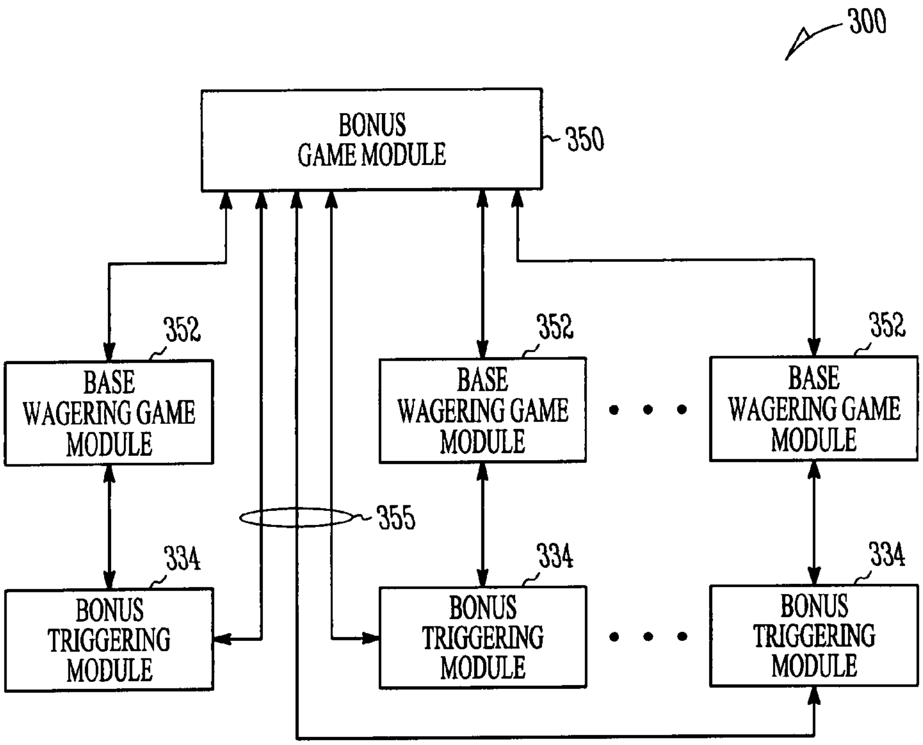
FIG. 3 is a block diagram illustrating wagering game architecture according to example embodiments of the invention.

FIG. 3 is a block diagram illustrating wagering game architecture 300 according to example embodiments of the invention. Here, the bonus triggering modules 334 are operatively coupled to the base wagering modules 352. For clarity, a single bonus game module 350 is shown operatively coupled to a plurality of base wagering game modules 352; however, the wagering game architecture 300 can include a plurality of bonus game modules, each presenting a different bonus game. The bonus triggering modules 334 can also be operatively coupled to the bonus game module 350 independent of the base wagering modules 352 using a transmission medium 355 such as a communications network. In one embodiment, the bonus triggering modules 334 form a portion of the base wagering modules 352. In another embodiment, the bonus triggering modules 334 are operatively coupled to the bonus game module 350.

Each of the base wagering game modules 352 can be configured to perform a different wagering game. In some embodiments, the base wagering game modules 352 are associated with different wagering game machines (not shown). The bonus triggering modules 334 can be configured to receive data from a bonus game module 350 related to a specified bonus game, such as payout frequencies, average payout values and expected values of wagers. The base wagering game modules 352 can be configured to receive data from and to provide data to the bonus triggering modules 334, such as base wagering game payout frequencies, payout values and an expected values of wagers. In various embodiments, each of the base wagering game modules 352 triggers the bonus game module 350 with the same frequency.

Example Operations

Figure 4:
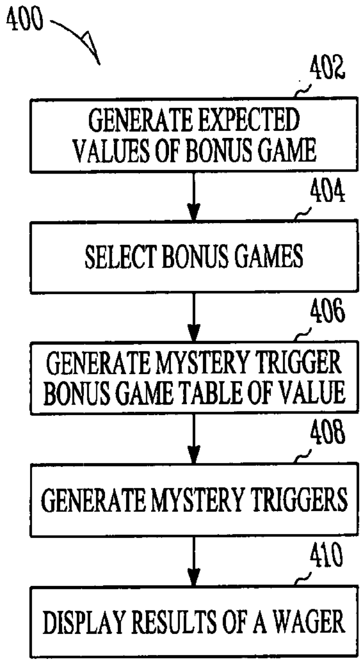
FIG. 4 is a flowchart illustrating a method for configuring one or more wagering game machines according to embodiments of the invention.

FIG. 4 is a flowchart illustrating features of an embodiment of a method 400 for regulating wagering game play according to embodiments of the invention. The method includes, at block 402, receiving a wager indicating a base wagering game is to begin. The expected value contributions of the available bonus games can be generated and stored in a memory. In an embodiment, the memory is located in a server coupled to a network further coupled to the base wagering game machine or to the bonus triggering module. In one embodiment, the server is located outside the casino. In another embodiment, the memory is located in a server or a database inside the casino. The memory can also be located in the base wagering game machine.

At block 404 some or all available bonus games are selected. In one embodiment, one or more available bonus games are selected by a player. In another embodiment, one or more available bonus games are selected by a wagering game operator. In another embodiment, the one or more bonus games are selected based on the information provided to an interactive display. In some embodiments, the selection of a bonus game requires an additional wager to be entered to play the selected bonus games. In various embodiments, selected bonus games can be changed, removed and added. In another embodiment, no bonus games can be selected. The bonus game module containing the available bonus games may be located in a wagering game machine, a network server, or a memory location associated with a database in the casino. In one embodiment, some or all bonus game modules can be located outside the casino coupled to a network.

At block 406, a table of values is generated for associating a plurality of available bonus games with a base wagering game. Such association may be provided using a random number generator. In an embodiment, the table of values include weighted values. In some embodiments, the table of values includes only information for accessing the bonus games that are selected. The table of values can be stored in the bonus triggering module, in a memory associated with the base wagering game, in a network device, or in a database coupled to a communications network.

At block 408, the bonus triggering module generates the mystery triggers and the table of values is used to provide access to a bonus game. In one embodiment, the bonus triggering module generate the mystery triggers and a table of weighted values is used to control access to a bonus game. In another embodiment, the mystery triggers can be generated for accessing a plurality of bonus games. A random number is generated and compared with the table of values. The corresponding bonus game is awarded based in the comparison.

At block 410, the results of the wager are presented to the player on a display associated with the wagering game machine. A bonus game can be played if a bonus game is awarded. In one embodiment, the bonus game can be one or more free games, such as a free spins of the reels. In another embodiment, the bonus game permits an additional wager to be entered.

Figure 5:
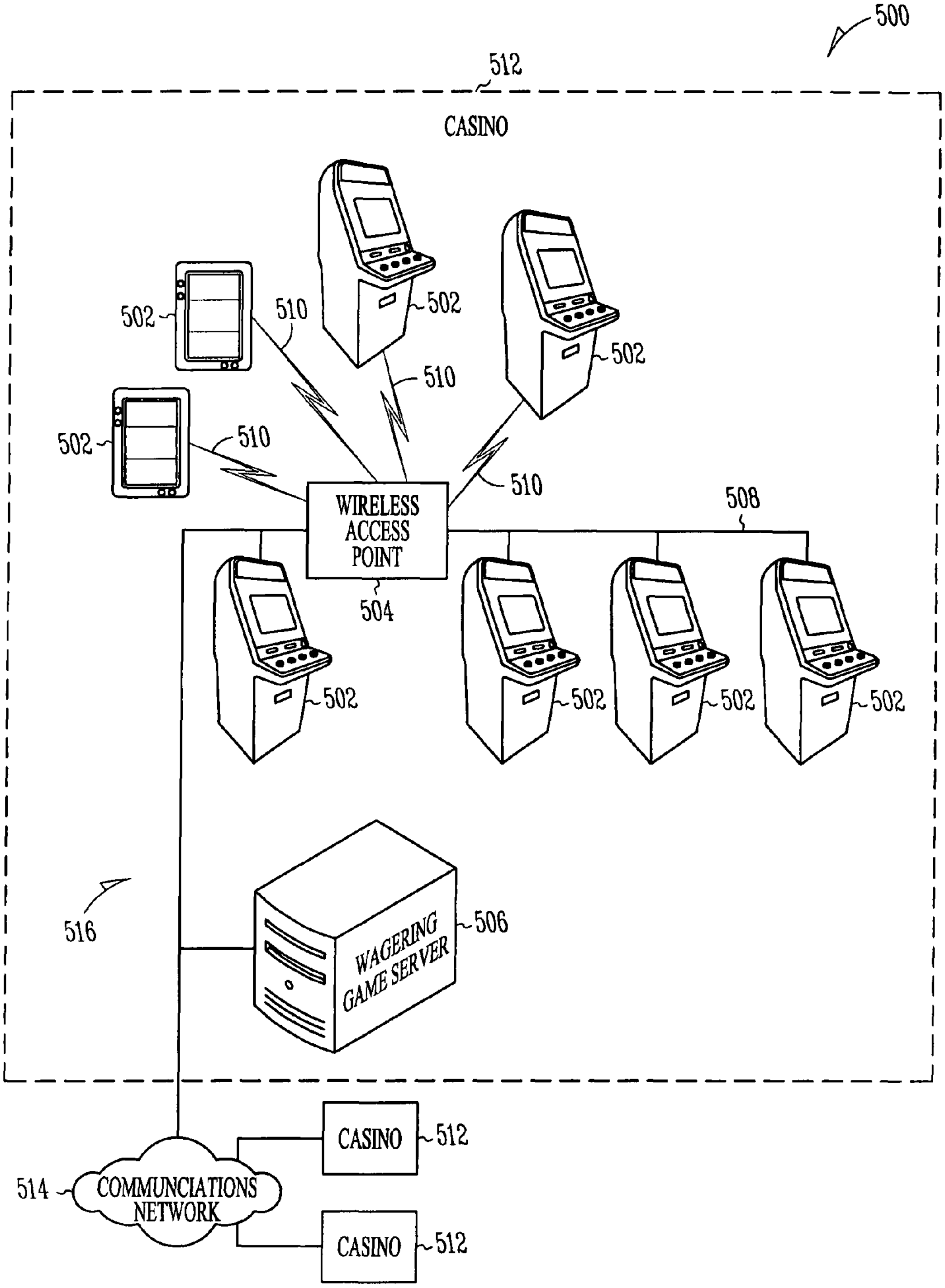
FIG. 5 is a block diagram illustrating a wagering game network, according to example embodiments of the invention.

While FIGS. 1, 2 and 3 describe example embodiments of a wagering game machine architecture. FIG. 5 shows how a plurality of wagering game machines can be connected in a wagering game network.

Example Wagering Game Network

FIG. 5 is a block diagram illustrating a wagering game network, according to example embodiments of the invention. As shown in FIG. 5, the wagering game network 500 includes a plurality of casinos 512 connected to a communications network 514.

Each of the plurality of casinos 512 includes a local area network 516, which includes a wireless access point 504, wagering game machines 502, and a wagering game server 506 that can serve wagering games over the local area network 515. As such, the local area network 515 includes wireless communication links 510 and wired communication links 508. The wired and wireless communication links can employ any suitable connection technology, such as Bluetooth, 802.11, Ethernet, public switched telephone networks, SONET, etc. In one embodiment, the wagering game server 506 can serve wagering games and/or distribute content to devices located in other casinos 512 or at other locations on the communications network 514.

The wagering game machines 502 and wagering game server 506 can include hardware and machine-readable media including instructions for performing the operations described herein. The wagering game network 500 can include the bonus triggering module (shown as 134 and 135 of FIG. 1) operable as discussed. In some embodiments, the wagering game server 506 includes a bonus triggering module 134/135. In one embodiment, the wagering game server 506 is located outside the casino 512 and communicatively coupled to the communications network 514 or the wireless access point 504.

The wagering game machines 502 described herein can take any suitable form, such as floor standing models, handheld mobile units, bartop models, workstation-type console models, etc. Further, the wagering game machines 502 can be primarily dedicated for use in conducting wagering games, or can include non-dedicated devices, such as mobile phones, personal digital assistants, personal computers, etc. In one embodiment, the wagering game network 500 can include other network devices, such as accounting servers, wide area progressive servers, player tracking servers, and/or other devices suitable for use in connection with embodiments of the invention.

Example Wireless Environment

In some embodiments, the wireless access point 504 and wagering game machines 502 can communicate using orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 504 and wagering game machines 502 can communicate in accordance with a broadband multiple access technique, such as orthogonal frequency division multiple access (OFDMA). In some embodiments, the wireless access point 504 and wagering game machines 502 can communicate using spread-spectrum signals.

In some embodiments, the wireless access point 504 can be part of a communication station, such as wireless local area network (WLAN) communication station including a Wireless Fidelity (WiFi) communication station, or a WLAN access point (AP). In these embodiments, the wagering game machines 502 can be part of a mobile station, such as WLAN mobile station or a WiFi mobile station.

In some other embodiments, the wireless access point 504 can be part of a broadband wireless access (BWA) network communication station, such as a Worldwide Interoperability for Microwave Access (WiMax) communication station, as the wireless access point 504 can be part of almost any wireless communication device. In these embodiments, the wagering game machines 502 can be part of a BWA network communication station, such as a WiMax communication station.

In some embodiments, any of the wagering game machines 502 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the frequency spectrums for the communication signals transmitted and received by the wireless access point 504 and the wagering game machines 502 can comprise either a 5 gigahertz (GHz) frequency spectrum, a 2.4 GHz frequency spectrum, or other frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access point 504 and the wagering game machines 502 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 504 and the wagering game machines 502 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 6005 and related amendments/versions.

In some embodiments, the wireless access point 504 and the wagering game machines 502 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points 504 and one of the wagering game machines 502 can be performed based on a signal-to-noise ratio (SNR), a signal-to-noise and interference ratio (SNIR), a bit-error rate (BER), or an energy per received bit.

In some embodiments, the wireless access point 504 and the wagering game machines 502 can communicate in accordance with standards such as the Pan-European mobile system standard referred to as the Global System for Mobile Communications (GSM). In some embodiments, the wireless access point 504 and the wagering game machines 502 can also communicate in accordance with packet radio services such as the General Packet Radio Service (GPRS) packet data communication service. In some embodiments, the wireless access point 504 and the wagering game machines 502 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 504 and the wagering game machines 502 can provide packet data services (PDS) utilizing packet data protocols (PDP). In other embodiments, the wireless access point 504 and the wagering game machines 502 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 504 and the wagering game machines 502 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 504 and the wagering game machines 502 can communicate in accordance with an ultra-wideband (UWB) communication technique where a carrier frequency is not used. In other embodiments, the wireless access point 504 and the wagering game machines 502 can communicate in accordance with an analog communication technique. In other embodiments, the wireless access point 504 and the wagering game machines 502 can communicate in accordance with an optical communication technique, such as the Infrared Data Association (IrDA) standard. In some embodiments, the wireless access point 504 and the wagering game machines 502 can communicate in accordance with the Home-RF standard which can be in accordance with a Home-RF Working Group (HRFWG) standard.

Example Wagering Game Machine

Figure 6:
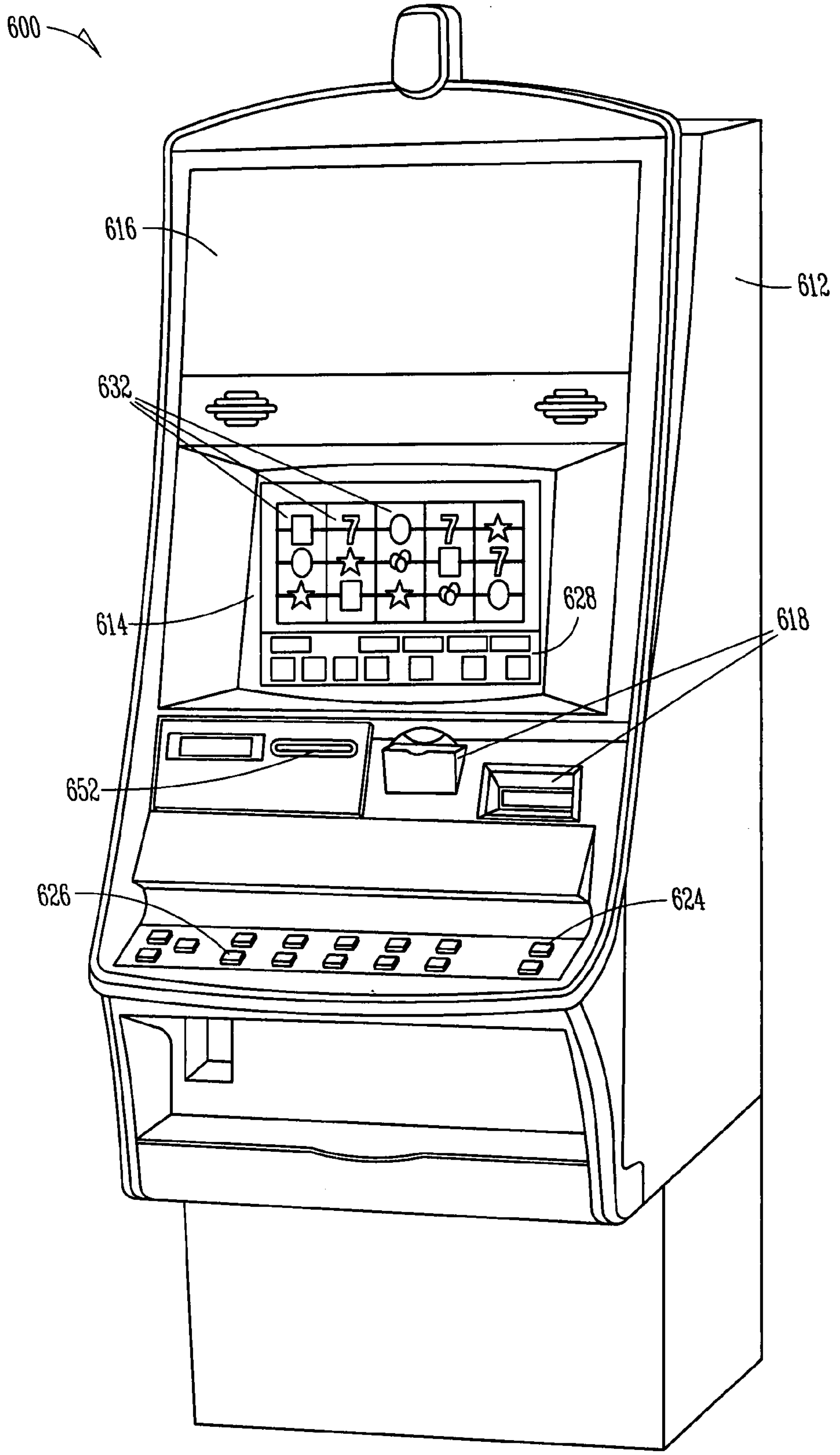
FIG. 6 is a perspective view of a wagering game machine, according to example embodiments of the invention.

FIG. 6 is a perspective view of a wagering game machine, according to example embodiments of the invention. Referring to FIG. 6, a wagering game machine 600 is used in gaming establishments, such as casinos. According to embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, or video role playing games with wagering content, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bartop model, mobile handheld model, or workstation console model.

A player begins playing a basic wagering game by making a wager via the value input device 618. The player can initiate play by using the player input device's buttons or touch screen 628. The basic game can include arranging a plurality of symbols along a payline 632, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Example Wagering Game Machine

Figure 7:
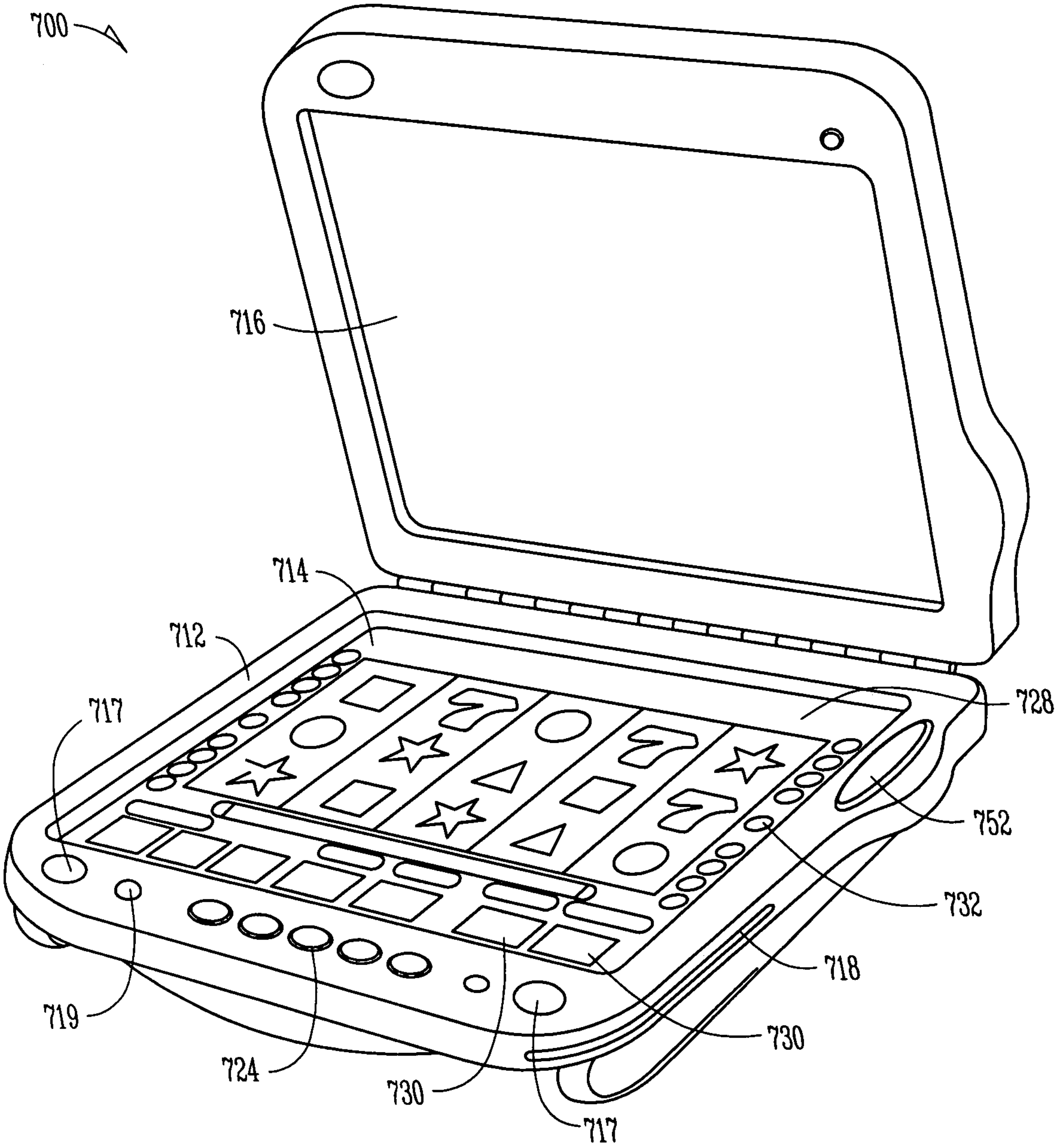
FIG. 7 shows an example embodiment of a wagering game machine.

FIG. 7 shows an example embodiment of a wagering game machine 710. Like free standing wagering game machines, in a handheld or mobile form, the wagering game machine 710 can include any suitable electronic device configured to play a video casino games such as blackjack, slots, keno, poker, blackjack, roulette, and video role playing games with wagering content. The wagering game machine 710 comprises a housing 712 and includes input devices, including a value input device 718 and a player input device 724. For output, the wagering game machine 710 includes a primary display 714, a secondary display 716, one or more speakers 717, one or more player-accessible ports 719 (e.g., an audio output jack for headphones, a video headset jack, etc.), and other conventional I/O devices and ports, which may or may not be player-accessible. In the embodiment depicted in FIG. 4, the wagering game machine 710 comprises a secondary display 716 that is rotatable relative to the primary display 714. The optional secondary display 716 can be fixed, movable, and/or detachable/attachable relative to the primary display 714. Either the primary display 714 and/or secondary display 716 can be configured to display any feature of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 718 can comprise, for example, a slot located on the front, side, or top of the casing 712 configured to receive credit from a stored-value card (e.g., casino card, smart card, debit card, credit card, etc.) inserted by a player. The player-accessible value input device 718 can also comprise a sensor (e.g., an RF sensor) configured to sense a signal (e.g., an RF signal) output by a transmitter (e.g., an RF transmitter) carried by a player. The player-accessible value input device 718 can also, or alternatively, include a ticket reader or barcode scanner for reading information stored on a credit ticket, a card, or other tangible portable credit or funds storage device. The credit ticket or card can also authorize access to a central account, which can transfer money to the wagering game machine 710.

Still other player-accessible value input devices 718 can use touch keys 730 on the touch-screen display (e.g., primary display 714 and/or secondary display 716) or player input devices 724. Upon entry of player identification information and, preferably, secondary authorization information (e.g., a password, PIN number, stored value card number, predefined key sequences, etc.), the player can be permitted to access a player's account. As one potential optional security feature, the wagering game machine 710 can be configured to permit a player to only access an account the player has specifically set up for the wagering game machine 710. Other conventional security features can also be utilized to, for example, prevent unauthorized access to a player's account, to minimize an impact of any unauthorized access to a player's account, or to prevent unauthorized access to any personal information or funds temporarily stored on the wagering game machine 710.

The player-accessible value input device 718 can itself comprise or utilize a biometric player information reader which permits the player to access available funds on a player's account, either alone or in combination with another of the aforementioned player-accessible value input devices 718. In an embodiment wherein the player-accessible value input device 718 comprises a biometric player information reader, transactions such as an input of value to the wagering game machine 710, a transfer of value from one player account or source to an account associated with the wagering game machine 710, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 718 comprising a biometric player information reader can require a confirmatory entry from another biometric player information reader 752, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. The value input device 718 may be provided remotely from the wagering game machine 710.

The player input device 724 comprises a plurality of push buttons on a button panel for operating the wagering game machine 710. In addition, or alternatively, the player input device 724 can comprise a touch screen mounted to a primary display 714 and/or secondary display 716. In one embodiment, the touch screen is matched to a display screen having one or more selectable touch keys 730 selectable by a user's touching of the associated area of the screen using a finger or a tool, such as a stylus pointer. A player enables a desired function either by touching the touch screen at an appropriate touch key 730 or by pressing an appropriate push button on the button panel. The touch keys 730 can be used to implement the same functions as push buttons. Alternatively, the push buttons 726 can provide inputs for one feature of the operating the game, while the touch keys 730 can allow for input needed for another feature of the game. The various components of the wagering game machine 710 can be connected directly to, or contained within, the casing 712, as seen in FIG. 4, or can be located outside the casing 712 and connected to the casing 712 via a variety of wired (tethered) or wireless connection methods. Thus, the wagering game machine 710 can comprise a single unit or a plurality of interconnected (e.g., wireless connections) parts which can be arranged to suit a player's preferences.

The operation of the basic wagering game on the wagering game machine 710 is displayed to the player on the primary display 714. The primary display 714 can also display the bonus game associated with the basic wagering game. The primary display 714 preferably takes the form of a high resolution LCD, a plasma display, an LED, or any other type of display suitable for use in the wagering game machine 710. The size of the primary display 714 can vary from, for example, about a 2-3" display to a 15" or 16" display. In at least some embodiments, the primary display 714 is a 6"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 714 and/or secondary display 716 can have a 16:9 aspect ratio or other aspect ratio (e.g., 4:3). The primary display 714 and/or secondary display 716 can also each have different resolutions, different color schemes, and different aspect ratios.

As with the free standing embodiments a wagering gaming machine, a player begins play of the basic wagering game on the wagering game machine 710 by making a wager (e.g., via the value input device 718 or an assignment of credits stored on the handheld gaming machine via the touch screen keys 730, player input device 724, or buttons 726) on the wagering game machine 710. In some embodiments, the basic game can comprise a plurality of symbols arranged in an array, and includes at least one payline 732 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 718 of the wagering game machine 710 can double as a player information reader 752 that allows for identification of a player by reading a card with information indicating the player's identity (e.g., reading a player's credit card, player ID card, smart card, etc.). The player information reader 752 can alternatively or also comprise a bar code scanner, RFID transceiver or computer readable storage medium interface. In one embodiment, the player information reader 752 comprises a biometric sensing device.

In the above detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. The various embodiments are not necessarily mutually exclusive, as some embodiments can be combined with one or more embodiments to form new embodiments. Features or limitations of various embodiments described herein do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

What is claimed is:

1. A gaming system primarily dedicated to playing at least one casino wagering game, the gaming system comprising:

a gaming machine including a value input device; and one or more controllers configured to:

detect, via the value input device, a physical item associated with monetary value and transfer the monetary value to the gaming machine;

receive base game data including data for generating outcomes of a base game;

receive bonus game data associated with one of a first bonus game having a first expected value (EV) or a second bonus game having a second, different EV, the bonus game data including data for generating outcomes of the respective bonus game;

based on the received base game data and the received bonus game data, integrate the base game and the bonus game associated with the bonus game data into a combined wagering game with a predetermined combined EV, and generate a bonus-game triggering frequency triggering a play of the bonus game associated with the received bonus game data during play of the base game, the bonus-game triggering frequency generated for the first bonus game being different than the bonus-game triggering frequency generated for the second bonus game, the first and second EVs being independent from any bonus-game triggering frequency;

initiate, on the gaming machine, a play of the base game of the combined wagering game in response to an input indicative of a wager covered by the value stored in the gaming machine; and trigger a play of the bonus game of the combined wagering game during the play of the base game.

2. The gaming system of claim 1, further comprising a bonus triggering module executed by at least one of the one or more controllers, the bonus triggering module being separate from a wagering game presentation unit, the bonus triggering module configured to receive the base game data and the bonus game data and to generate the bonus-game triggering frequency based on the received base game data and the received bonus game data.

3. The gaming system of claim 2, wherein the bonus triggering module resides within the gaming machine.

4. The gaming system of claim 2, wherein the bonus triggering module includes a table of values, and wherein the bonus triggering module compares random numbers to the table of values and triggers the play of the bonus game based on the comparison.

5. The gaming system of claim 1, further comprising a bonus triggering module executed by at least one of the one or more controllers, the bonus triggering module being separate from a wagering game presentation unit, the bonus triggering module configured to receive the base game data and the bonus game data and to generate random events that trigger the play of the bonus game during the play of the base game according to the bonus-game triggering frequency.

6. The gaming system of claim 1, wherein at least the bonus game data is transmitted over an external communications network and received at a network interface connected for communication with the one or more controllers.

7. The gaming system of claim 1, wherein the base game is selected from a plurality of base games.

8. The gaming system of claim 1, wherein the first and second bonus games are selected from a plurality of bonus games.

9. The gaming system of claim 1, wherein at least one of the base game, the first bonus game, and the second bonus game is selected from a plurality of base games or bonus games, respectively, by a player via an electronic input device at the gaming machine.

10. The gaming system of claim 1, wherein the bonus game data and the base game data are unaffected by events occurring during play of the combined wagering game.

11. A gaming machine primarily dedicated to playing at least one casino wagering game, the gaming machine being operative to integrate a bonus game with a base game to produce a combined wagering game having a predetermined combined expected value (EV), the gaming machine comprising:

a value input device; and one or more controllers configured to:

detect, via the value input device, a physical item associated with monetary value and transfer the monetary value to the gaming machine;

receive base game data associated with the base game including data for generating outcomes of the base game;

in response to receiving bonus game data associated with a first bonus game having a first EV that is independent of any bonus-game triggering frequency, generate a first bonus-game triggering frequency that triggers a play of the first bonus game during play of the base game to create a first combined wagering game, the first bonus-game triggering frequency being based on the base game data and the first bonus game data, and the first bonus-game triggering frequency maintaining the predetermined combined EV;

in response to receiving bonus game data associated with a second, different bonus game having a second, different EV that is independent of any bonus-game triggering frequency, generate a second bonus-game triggering frequency that triggers a play of the second bonus game during play of the base game to create a second combined wagering game, the second bonus-game triggering frequency being based on the base game data and the second bonus game data, the second bonus-game triggering frequency being different from the first bonus-game triggering frequency, and the second bonus-game triggering frequency maintaining the predetermined combined EV;

initiate a play of the base game of the first or second combined wagering game in response to an input indicative of a wager covered by the monetary value stored in the gaming machine; and trigger a play of the first or second bonus game of the respective first or second combined wagering game during the play of the base game.

12. The gaming machine of claim 11, wherein the EVs of the first and the second bonus games are defined by:

$$EV_{Bonus\ Game}=\Sigma_{all\ k}(\text{frequency}(k)\times\text{Pay}(k))_{Bonus\ Game}.$$

13. The gaming machine of claim 11, wherein the relationship between the base game, the first and second bonus EVs, and the predetermined combined EV is expressed by:

$$EV_{Combined\ Wagering\ Game}=EV_{Base\ Game}+EV_{Bonus\ Game},$$

where $$EV_{Base\ Game}=\Sigma_{all\ k}(\text{frequency}(k)\times\text{Pay}(k))_{Base\ Game},$$

and $$EV_{Bonus\ Game}=\Sigma_{all\ k}(\text{frequency}(k)\times\text{Pay}(k))_{Bonus\ Game}.$$

14. The gaming machine of claim 11, wherein the base game and the first and second bonus games have base game payout values and bonus game payout values, respectively, that are independent of the first and second bonus-game triggering frequencies.

15. The gaming machine of claim 11, wherein at least one of the first and second bonus-game triggering frequencies is independent of symbols appearing in a symbol array representing outcomes of the combined wagering game.

16. The gaming machine of claim 11, wherein the one or more controllers are further configured to direct an electronic display device to display a gauge indicating probabilities related to the first or the second bonus game.

17. The gaming machine of claim 11, wherein the one or more controllers are further configured to direct an electronic display device to display a gauge related to one of the bonus-game triggering frequency and a bonus-game payout frequency.

18. The gaming machine of claim 11, wherein at least the bonus game data is transmitted over an external communications network and received at a network interface connected for communication with the one or more controllers.

19. The gaming machine of claim 11, wherein at least one of the base game, the first bonus game, and the second bonus game is selected from a plurality of base games or bonus games, respectively.

20. The gaming machine of claim 19, wherein the selected bonus game is selected by a player via an electronic input device.

21. The gaming machine of claim 11, wherein the bonus game data and the base game data are unaffected by events occurring during play of the combined wagering game.

22. A method of operating a gaming system that integrates a bonus game with a base game, the gaming system including one or more controllers and a gaming machine, the gaming machine primarily dedicated to playing at least one casino wagering game and including a value input device, the method comprising:

detecting, with the value input device, a physical item associated with monetary value and transferring the monetary value to the gaming machine;

receiving base game data including data for generating outcomes of an associated base game;

in response to receiving first bonus game data associated with a first bonus game having a first EV that is independent of any bonus-game triggering frequency, generating, via the one or more controllers, a first bonus-game triggering frequency that triggers a play of the first bonus game during play of the base game to create a first combined wagering game, wherein the first bonus-game triggering frequency is based on the base game data and the first bonus game data, and the first bonus game triggering frequency maintains a predetermined combined EV;

in response to receiving second bonus game data associated with a second bonus game having a second, different EV that is independent of any bonus-game triggering frequency, generating, via the one or more controllers, a second bonus-game triggering frequency that triggers a play of the second bonus game during play of the base game to create a second combined wagering game, wherein the second bonus-game triggering frequency is based on the base game data and the second bonus game data, the second bonus-game triggering frequency is different from the first bonus-game triggering frequency, and the second bonus-game triggering frequency maintains the predetermined combined EV;

initiating, on the gaming machine, a play of the base game the first or second combined wagering game in response to an input indicative of a wager covered by the monetary value stored in the gaming machine; and triggering a play of the first or second bonus game of the respective first or second combined wagering game during the play of the base game.

23. The method of claim 22, wherein the first and the second EVs are defined by:

$$EV_{Bonus\ Game}=\Sigma_{all\ k}(\text{frequency}(k)\times\text{Pay}(k))_{Bonus\ Game}.$$

24. The method of claim 17, wherein the relationship between the base game, the first and second bonus game EVs, and the predetermined combined EV is expressed by:

$$EV_{Combined\ Wagering\ Game}=EV_{Base\ Game}+EV_{Bonus\ Game},$$

where $$EV_{Base\ Game}=\Sigma_{all\ k}(\text{frequency}(k)\times\text{Pay}(k))_{Base\ Game},$$

and $$EV_{Bonus\ Game}=\Sigma_{all\ k}(\text{frequency}(k)\times\text{Pay}(k))_{Bonus\ Game}.$$

25. The method of claim 22, wherein the first and second bonus game data are transmitted over an external communications network and received at a network interface connected for communication with the one or more controllers.

26. The method of claim 22, wherein the bonus game data and the base game data are unaffected by events occurring during play of the combined wagering game.

27. The method of claim 22, the gaming system further comprising a bonus triggering module executed by at least one of the one or more controllers, the bonus triggering module being separate from a wagering game presentation unit, the bonus triggering module configured to receive the base game data and the bonus game data and to generate the bonus-game triggering frequency based on the received base game data and the received bonus game data.

28. The method of claim 27, wherein the bonus triggering module resides within the gaming machine.

29. The method of claim 27, wherein the bonus triggering module includes a table of values, and wherein the bonus triggering module compares random numbers to the table of values and triggers the play of the bonus game based on the comparison.

30. The method of claim 22, further comprising a bonus triggering module executed by at least one of the one or more controllers, the bonus triggering module being separate from a wagering game presentation unit, the bonus triggering module configured to receive the base game data and the bonus game data and to generate random events that trigger the play of the bonus game during the play of the base game according to the bonus-game triggering frequency.

31. The method of claim 22, wherein the first and second bonus games are selected from a plurality of bonus games.

32. The method of claim 22, wherein at least one of the base game, the first bonus game, and the second bonus game is selected from a plurality of base games or bonus games, respectively, by a player via an electronic input device at the gaming machine.

* * * * *